(12) United States Patent
Lau

(10) Patent No.: US 12,399,911 B2
(45) Date of Patent: *Aug. 26, 2025

(54) SYSTEM AND METHOD FOR CAPTURING WORKLOADS IN A MULTIDIMENSIONAL DATABASE ENVIRONMENT

(71) Applicant: ORACLE INTERNATIONAL CORPORATION, Redwood Shores, CA (US)

(72) Inventor: Kenneth Lau, Mountain View, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,033

(22) Filed: May 14, 2024

(65) Prior Publication Data

US 2024/0303253 A1 Sep. 12, 2024

Related U.S. Application Data

(63) Continuation of application No. 15/332,794, filed on Oct. 24, 2016, now Pat. No. 12,001,454.
(Continued)

(51) Int. Cl.
*G06F 16/28* (2019.01)
*G06F 11/30* (2006.01)
*G06F 11/34* (2006.01)

(52) U.S. Cl.
CPC ............ *G06F 16/283* (2019.01); *G06F 11/30* (2013.01); *G06F 11/3414* (2013.01); *G06F 2201/80* (2013.01)

(58) Field of Classification Search
CPC ..... G06F 16/283; G06F 11/30; G06F 11/3414
See application file for complete search history.

(56) References Cited

U.S. PATENT DOCUMENTS

| 6,236,993 B1 * | 5/2001 | Fanberg ............ G06F 8/78 |
| | | 707/999.001 |
| 12,001,454 B2 | 6/2024 | Lau |

(Continued)

OTHER PUBLICATIONS

Nima Honarmand et al., "Replay Debugging: Leveraging Record and Replay for Program Debugging", © 2014 IEEE, 12 pages.
(Continued)

*Primary Examiner* — Apu M Mofiz
*Assistant Examiner* — Farhad Agharahimi
(74) *Attorney, Agent, or Firm* — TUCKER ELLIS LLP

(57) ABSTRACT

In accordance with an embodiment, described herein is a system and method for capturing workloads in a multidimensional database environment. Workloads in the multidimensional database environment can be captured over a period of time as an archive file, which can be replayed using a standalone player against the same multidimensional database environment, or a different multidimensional database environment. The standalone player can selectively replay any portion of the archive file. Results from the replay can be compared to original base results in the recorded archive; and any difference between the results can be displayed. The player can filter out noise and expected differences, and display unexpected differences, including paths for potential issues, for use in troubleshooting, and environment and patching validation.

17 Claims, 7 Drawing Sheets

Related U.S. Application Data

(60) Provisional application No. 62/245,896, filed on Oct. 23, 2015.

(56) References Cited

U.S. PATENT DOCUMENTS

| | | | |
|---|---|---|---|
| 2004/0015600 A1* | 1/2004 | Tiwary | G06F 11/3414 |
| | | | 714/E11.193 |
| 2004/0039736 A1* | 2/2004 | Kilmer | G06F 16/283 |
| 2008/0097995 A1* | 4/2008 | Dias | G06F 16/2379 |
| 2012/0005174 A1* | 1/2012 | Vora | G06F 11/3684 |
| | | | 707/703 |
| 2012/0221513 A1* | 8/2012 | Papadomanolakis | G06F 16/25 |
| | | | 707/610 |
| 2012/0221519 A1* | 8/2012 | Papadomanolakis | |
| | | | G06F 11/3688 |
| | | | 707/610 |
| 2017/0116254 A1 | 4/2017 | Lau | |

OTHER PUBLICATIONS

United States Patent and Trademark Office, Office Communication dated Jan. 8, 2019 for U.S. Appl. No. 15/332,794 , 20 pages.
United States Patent and Trademark Office, Office Communication dated Oct. 18, 2019 for U.S. Appl. No. 15/332,794 , 21 pages.
United States Patent and Trademark Office, Office Communication dated Feb. 27, 2020 for U.S. Appl. No. 15/332,794 , 4 pages.
United States Patent and Trademark Office, Office Communication dated Apr. 2, 2020 for U.S. Appl. No. 15/332,794 , 18 pages.
United States Patent and Trademark Office, Office Communication dated Oct. 19, 2020 for U.S. Appl. No. 15/332,794 , 20 pages.
United States Patent and Trademark Office, Office Communication dated Feb. 2, 2021 for U.S. Appl. No. 15/332,794 , 4 pages.
United States Patent and Trademark Office, Office Communication dated Jun. 25, 2021 for U.S. Appl. No. 15/332,794 , 17 pages.
United States Patent and Trademark Office, Office Communication dated Dec. 14, 2021 for U.S. Appl. No. 15/332,794 , 18 pages.
United States Patent and Trademark Office, Office Communication dated Apr. 25, 2022 for U.S. Appl. No. 15/332,794 , 19 pages.
United States Patent and Trademark Office, Office Communication dated Dec. 9, 2022 for U.S. Appl. No. 15/332,794 , 19 pages.
United States Patent and Trademark Office, Office Communication dated Apr. 19, 2023 for U.S. Appl. No. 15/332,794 , 4 pages.
United States Patent and Trademark Office, Office Communication dated Sep. 28, 2023 for U.S. Appl. No. 15/332,794 , 9 pages.
United States Patent and Trademark Office, Office Communication dated Dec. 12, 2023 for U.S. Appl. No. 15/332,794 , 2 pages.
United States Patent and Trademark Office, Notice of Allowance and Fee(s) Due dated Jan. 25, 2024 for U.S. Appl. No. 15/332,794 , 11 pages.

* cited by examiner

```
511 ─ C:\work>java --jar EssSVPlayer.jar localhost admin password sample Basic C:\testCase\EmptyCube.saz
513 ─ C:\testcase\EmptyCube.saz:<req_ExecuteGrid>[11]
515 ─ /res_ExecuteGrid[1]/grid[1]/slices[1]/slice[1]/data[1]/range[1]/vals[1]/text<>/[1]
      Base:   |Mesaures|Prodcut|Market|Scenario|Year|||||
516 ─ test:   |Measures|Product|Market|Scenario|Year|105522.0|||||
517 ─ /res_ExecuteGrid[1]/grid[1]/slices[1]/slice[1]/data[1]/range[1]/status[1]/text<>/[1]
      Base:  0|1342177739|2684354475|402653203|135|8193|0|0|0
518 ─ test:  0|1342177739|2684354475|402653203|135|1|0|0|0
```

*FIGURE 5A*

SYSTEM AND METHOD FOR CAPTURING WORKLOADS IN A MULTIDIMENSIONAL DATABASE ENVIRONMENT

CLAIM OF PRIORITY

This application is a continuation of and claims the benefit of priority to U.S. patent application titled "SYSTEM AND METHOD FOR CAPTURING WORKLOADS IN A MULTIDIMENSIONAL DATABASE", application Ser. No. 15/332,794, filed Oct. 24, 2016; which claims the benefit of priority to U.S. Provisional application titled "SYSTEM AND METHOD FOR CAPTURING WORKLOADS IN A MULTIDIMENSIONAL DATABASE", Application No. 62/245,896, filed Oct. 23, 2015; each of which above applications and the contents thereof are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases and data warehousing, and are particularly related to a system and method for capturing workloads in a multidimensional database environment.

BACKGROUND

Workloads in a multidimensional database can be generated by users querying the database, and the database processing queries and returning results to the users. Typically, multiple users can simultaneously execute ad-hoc queries, and each user is not tracking the outcome of each query at any given time. As such, analyzing workloads and troubleshooting issues that occurred in a multidimensional database environment can be challenging.

SUMMARY

In accordance with an embodiment, described herein is a system and method for capturing workloads in a multidimensional database environment. The system can capture entire workloads in the multidimensional database environment over any period of time as an archive file, which can be replayed using a standalone player against the same multidimensional database environment, or a different multidimensional database environment. The standalone player can selectively replay any portion of the archive file. Results from the replay can be compared to original base results in the recorded archive. Any difference between the results of the replay and the original base results can be displayed in an easy to read format. The player can filter out noise and any expected difference, and display only unexpected differences. The unexpected differences can include paths for potential issues, thereby saving users time in troubling shooting, and environment and patching validation.

BRIEF DESCRIPTION OF THE FIGURES

FIGS. 5A-5B show an example use of the system in accordance with an embodiment.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
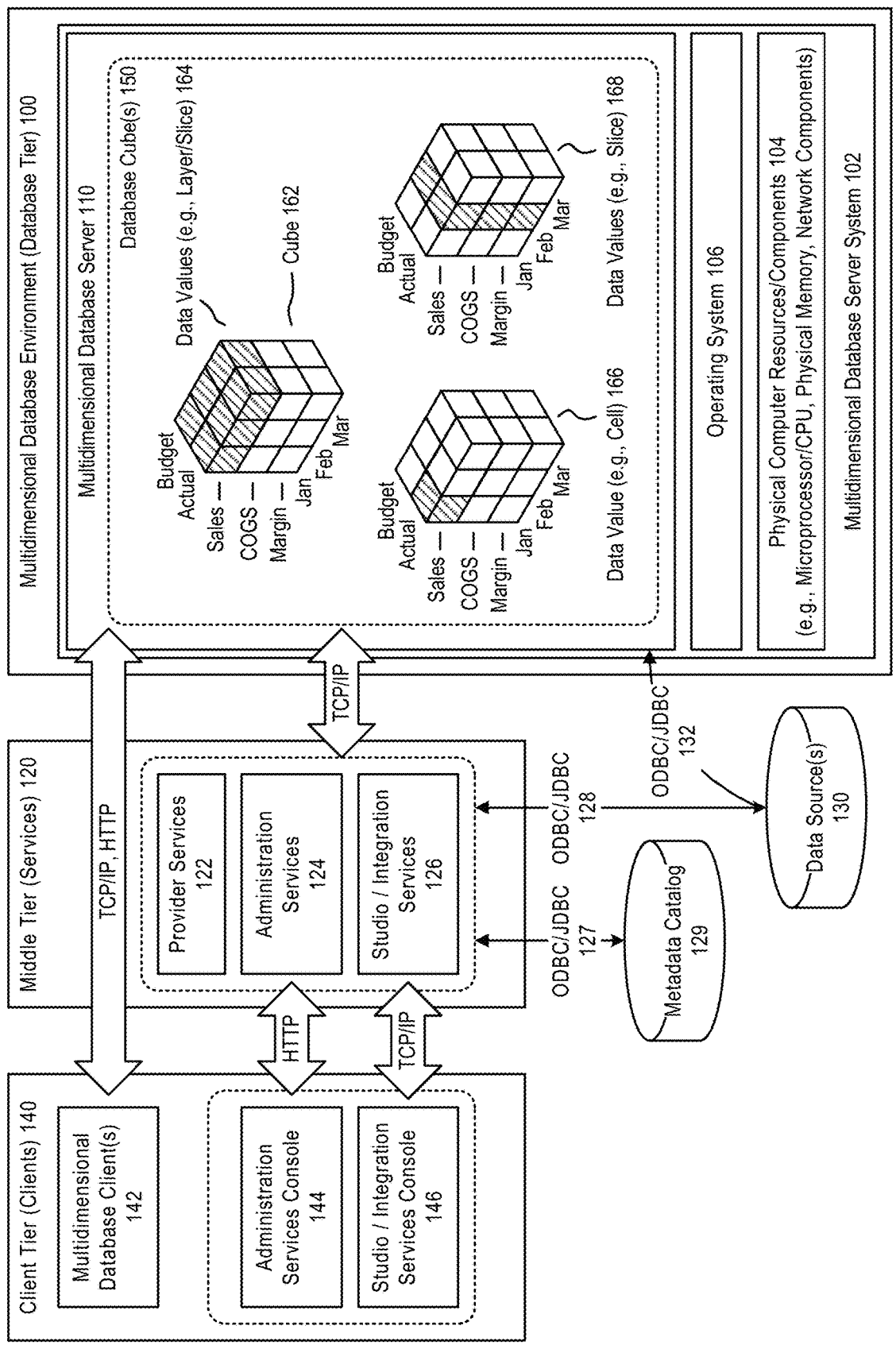
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Essbase Provider Services) operates as a data-source provider for Java API, Smart View, and XMLA clients.

Smart View

In accordance with an embodiment, a Smart View provides a common Microsoft Office interface for, e.g., Hyperion Essbase, Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

Capture of Workloads (5695US1)

A data analysis and reporting tool, for example, Oracle's Smart View for Office (Smart View), can be used to view, import, manipulate, distribute and share data in a multidimensional database environment. During interactions between the data analysis and reporting tool and the multidimensional database environment, workloads can be generated by users querying the multidimensional database environment, and the multidimensional database environment processing queries and returning results to the users.

In accordance with an embodiment, the system and method described herein can capture entire workloads in the multidimensional database environment over any period of time as an archive file, which can be replayed using a standalone player against the same multidimensional database environment, or a different multidimensional database environment. The standalone player can selectively replay any portion of the archive file. Results from the replay can be compared to original base results in the recorded archive. Any difference between the results of the replay and the original base results can be displayed in an easy to read format. The player can filter out noise and any expected difference, and display only unexpected differences. The unexpected differences can include paths for potential issues, thereby saving users time in troubling shooting.

In accordance with an embodiment, the archive file can include Smart View use cases, and can capture entire end user Smart View option sets and all the communications between the Smart View and the multidimensional database environment captured. The Smart View use cases can be recorded using Smart View Diagnostics Tools, or web debugging applications like Fiddler. A Smart View diagnostic tool can be provided as a built-in to the Smart View, for use in recording the Smart View use cases to generate the archive file.

In accordance with an embodiment, the player can be a standalone Java program in a self-contained Jar file that does not require any dependencies, set up or configuration.

Embodiments of the present invention can improve efficiency in troubling shooting, environment validation, patching validation and verification, and concurrency and workload testing in a multidimensional database environment.

For example, with the player, a support analyst does not need to examine huge log files to pinpoint where the problem occurs. Instead, the system can display the differences between the recorded result and the replay result in a graphical user interface, with information that pinpoints locations where potential problems occur.

Figure 2:
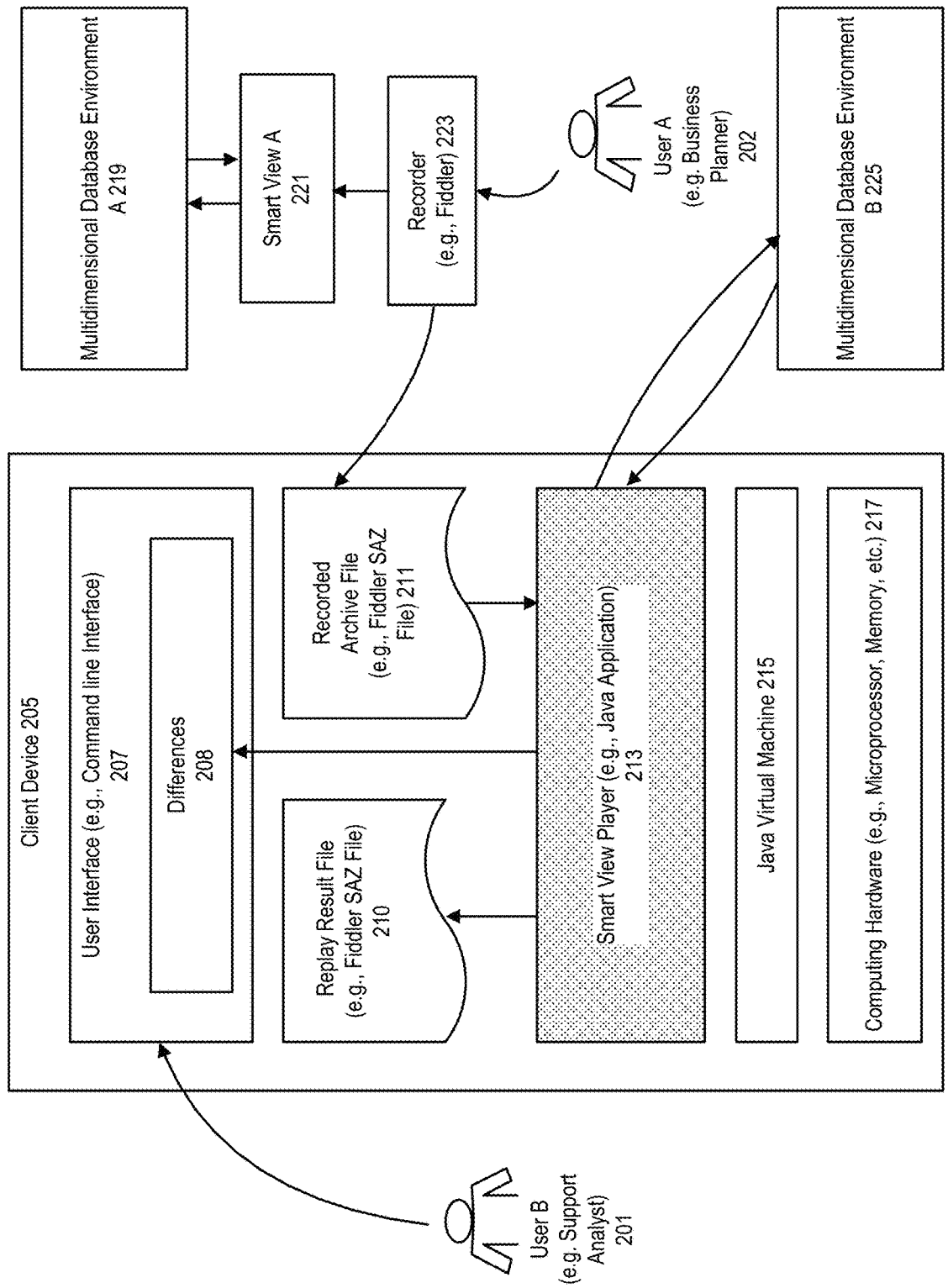
FIG. 2 illustrates a system for capturing workloads in a multidimensional database environment, in accordance with an embodiment.

FIG. 2 illustrates a system for capturing a multidimensional database environment, in accordance with an embodiment.

As shown in FIG. 2, the system can reside in a client device 205 executing on one or more microprocessors 217, and a Java virtual machine 215 installed in the client device. The system can also include a Smart View Player 213 executing on the Java virtual machine.

In accordance with an embodiment, the system can use a recorder 223 to record workloads in multidimensional database environment A 219 into an archive file. The workloads can include all the traffic between Smart View A 221 and multidimensional database environment A over a period of time, including actions taken and responses received by user A 202.

In the accordance with an embodiment, the recorder can start to record the traffic between the Smart View and the multidimensional database environment, in response to a request from user B 201 after encountering one or more problems while performing operations on the multidimensional database environment A through Smart View A.

In accordance with an embodiment, user B can provide the recorded archive file 211 to the client device, or a designated location (for example, a directory on a different computer), so that user B can locate the archive file, and use the Smart View player 213 to replay the archive file, or a subset of operations in the recorded archive file, against multidimensional database environment B 225.

In accordance with an embodiment, during the replay, the player can apply inputs for each of a plurality of use cases in the recorded archive file against multidimensional database environment B, and generate a replay result file 210, which can also be an archive file that is in the same format with the recorded archive file.

In accordance with an embodiment, the player can determine which input in the recorded archive file should be applied against multidimensional database environment B, and which input in the recorded archive file should be dynamically replaced during the replay.

For example, multidimensional database server names and database cube names in the recorded archive file can be replaced if the names specified at run time are not the the same as those in the recorded archive file.

In accordance with an embodiment, the Smart View player can compare the the recorded archive file and the replay result file to determine any differences. If there are any differences, the Smart View player can output the differences 208 to a user interface 207. Each difference can be represented by a first data from the recorded archive file, and a second data from the replay output file, a path pointing to the second data in the replay out file, and a user request that generates the second data.

In accordance with an embodiment, the differences can be unexpected differences that have passed through one or more filters in the Smart View Player, and include paths for potential issues. User B can use an application program, for example, Fiddler, to open the replay result file, and follow the paths to the potential problematic locations. As such, the unexpected differences can be used to troubleshoot or narrow down problems, thereby saving users the trouble of having to go through log files to find problems.

In accordance with an embodiment, to generate differences that are more useful in debugging, multidimensional database environment A and multidimensional database environment B need to have the same database outline.

In accordance with an embodiment, user A can provide a copy of a database outline in multidimensional database environment A to user B, who can subsequently create the database outline in multidimensional database environment B. Alternatively, multidimensional database environment A and multidimensional database environment B can be different versions of a same multidimensional database environment, thereby including the same database outline.

Additional uses of the features described above include environment validation, and patching validation and verification. For example, a user can record an archive file capturing information for a plurality of use cases on a development multidimensional database environment, and replay the recorded archive file against a production multidimensional database environment. If the Smart View Player does not generate differences between the recorded archive file and a replay result file, the development multidimensional database environment can be considered to be validated against the production multidimensional database environment.

Similarly, an archive file can be recorded against a multidimensional database environment before a patch is applied, and can be replayed against the same multidimensional database environment after the patch is applied. If the Smart View Player does not detect any differences between the archive file and a replay result file, the patch can be considered validated, and does not break the patched multidimensional database environment.

Figure 3:
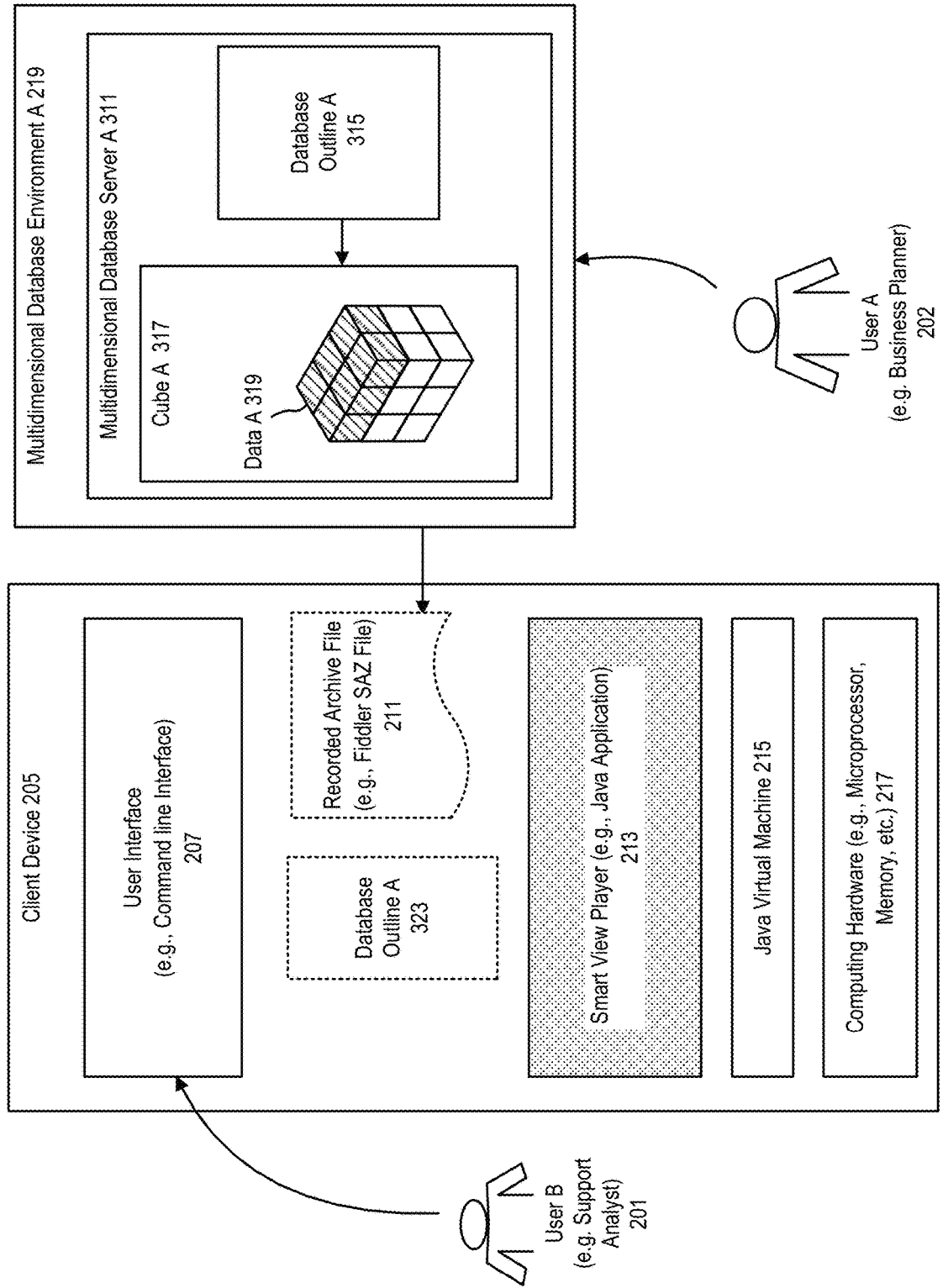
FIG. 3 illustrates a system for capturing workloads in a multidimensional database environment, in accordance with an embodiment.

FIG. 3 further illustrates a system for capturing workloads in a multidimensional database environment, in accordance with an embodiment.

As shown in FIG. 3, multidimensional database environment A can include a multidimensional database server A 311, and database outline A 315 that defines cube A 317.

As further shown in FIG. 3, cube A can include data A 319, which can be testing data that user A uses to run a plurality of use cases.

In accordance with an embodiment, user A, when providing the recorded archive file to user B or uploading the recorded archive file to a designated location in the client device, can provide database outline A to user B or upload database outline A to the designated location in the client device, unless user A is certain that multidimensional database environment B against which the recorded archive file is to be replayed already contains database outline A.

For example, as shown in FIG. 3, database outline A 323 and the recorded archive file 211 are both uploaded to the computing environment.

Figure 4:
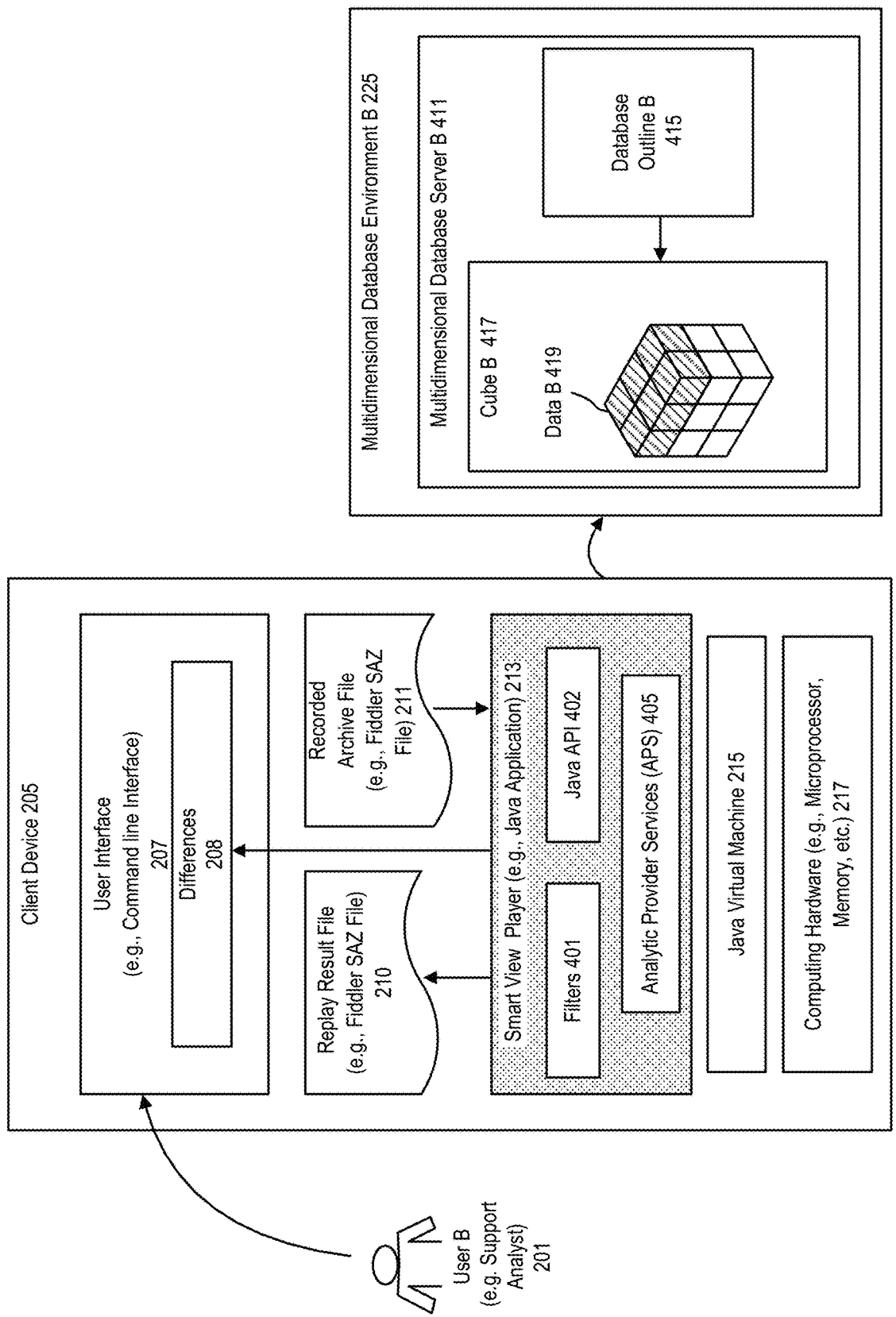
FIG. 4 illustrates a system for capturing workloads in a multidimensional database environment, in accordance with an embodiment.

FIG. 4 further illustrates a system for capturing workloads in a multidimensional database environment, in accordance with an embodiment.

As shown in FIG. 4, the Smart View Player can include one or more filters 401, one or more analytic provider services 405, and a Java API 402 for accessing the one or more provider services. The one or more provider services can be provided by Jar files that mirror a multidimensional database installation stack.

In accordance with an embodiment, the one or more filters in the Smart View Player can be configured to filter out expected differences, for example, differences caused by different data in different multidimensional database environments; and any operations in the recorded archive file that are not related to the Smart View application.

As shown in FIG. 4, the Smart View Player can be triggered to replay the recorded archive file against multidimensional database server B 411, which can include database outline B 415 created therein based on database outline A, and data B 419 which may be different from data A in multidimensional database environment A.

In accordance with an embodiment, the Smart View Player can be executed using a command as follows:
    java-jar EssSVPlay.jar slc00tlb.us.oracle.com admin password Sample Basic ZoomIn.saz In the above command, "EssSVPlay.jar" is the Smart View Player that represents a Java application in a single Jar. "slc00tlb.us.oracle.com" is the multidimensional database environment against which a recorded archive file "ZoomIn.saz" is to be replayed. "admin" and "password" represent login credentials required for logging into a multidimensional database server. "Sample" and "Basic" respectively represent a multidimensional database application and a cube name in the multidimensional database environment.

In accordance with an embodiment, a properties file can be provided to include parameters needed for accessing the multidimensional database environment and executing the Smart View Player Java program. The properties file can also be used to specify custom configuration parameters for use by the one or more filters in the Smart View Player to filter out any expected differences between the recorded archive file and a replay output file.

In accordance with an embodiment, the Smart View Player can simulate multiple Smart View users accessing a multidimensional server concurrently. Replay of Smart View archive files (recordings) can be automated through a JUnit test framework, and can be replayed together by specifying wildcards as the value of the file name parameter in the command.

In accordance with an embodiment, in the command for executing the Smart View Player, the multidimensional database application name and the cube name are optional, and can be left blank. The Smart View Player can take the default values from the recorded archive file.

However, user credentials need to be provided to the Smart View Player because of security. The Smart View Player can integrate with multiple security services, including Hyperion Common Security Services (CSS), Oracle Platform Security Services (OPSS), and native Essbase security. A user can sign in using any supported security credentials.

Figure 5B:
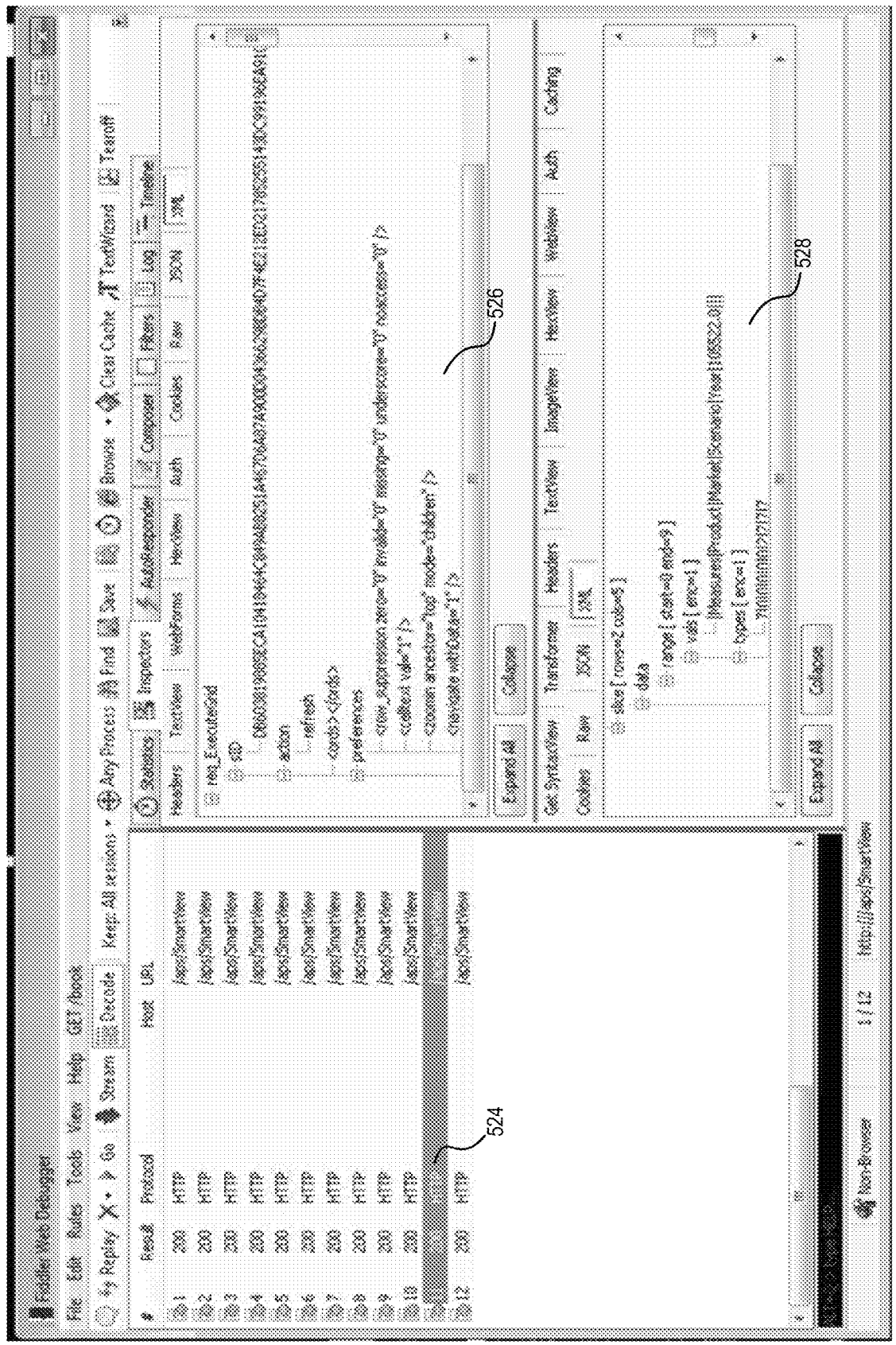

FIGS. 5A-5B show an example use of the system in accordance with an embodiment.

As shown in FIG. 5A, a command 511 can be used to execute a Smart View Player represented by a self-contained Jar file "EssSVPlay.jar", to replay a recorded archive file "EmptyCube.saz" against an Essbase server "localhost".

In this particular example, the recorded archive file "EmptyCube.saz" is recorded against an Essbase server where the cube is emptied out. However, before the replay of the recorded archive file, data is loaded into the cube in the Essbase server. As such, the archive file is recorded and replayed against the Essbase server at different points in time.

The Smart View Player can compare the recorded archive file and a replay output file, and output any differences based on the comparison between the two files. For each displayed difference, different values between the recorded archive file and the replay output file can be displayed for a particular cell, or for a particular property of the particular cell. A path to each cell and the property of that cell can also be displayed, together with a request name and a request number associated with each displayed difference.

For example, as shown in FIG. 5A, the Smart View Player displays two differences 516 and 518 between the recorded archive file and the replay output file. The differences are associated with a request "req_ExecuteGrid" and an associated request number (e.g., 11) 513. In addition, the difference 516 is associated with a path 515 to a particular cell, and the difference 518 is associated with a path 517 to a property (e.g., status) of the particular cell.

FIG. 5B shows that the replay output file is opened using a recording application (for example, Fiddler) used to generate the recorded archive file.

In FIG. 5B, a plurality of requests from a Smart View to the Essbase server is listed. A user can use click on the request 524 with a request number 11, since a difference associated with this particular request is listed between the recorded archive file and the replay output file in FIG. 5A.

The top panel 526 on the right displays additional information about the request, and the bottom panel 528 shows an XML tree structure that can be navigated to one or more potential problems using the path 515 to the particular cell shown in FIG. 5A.

Figure 6:
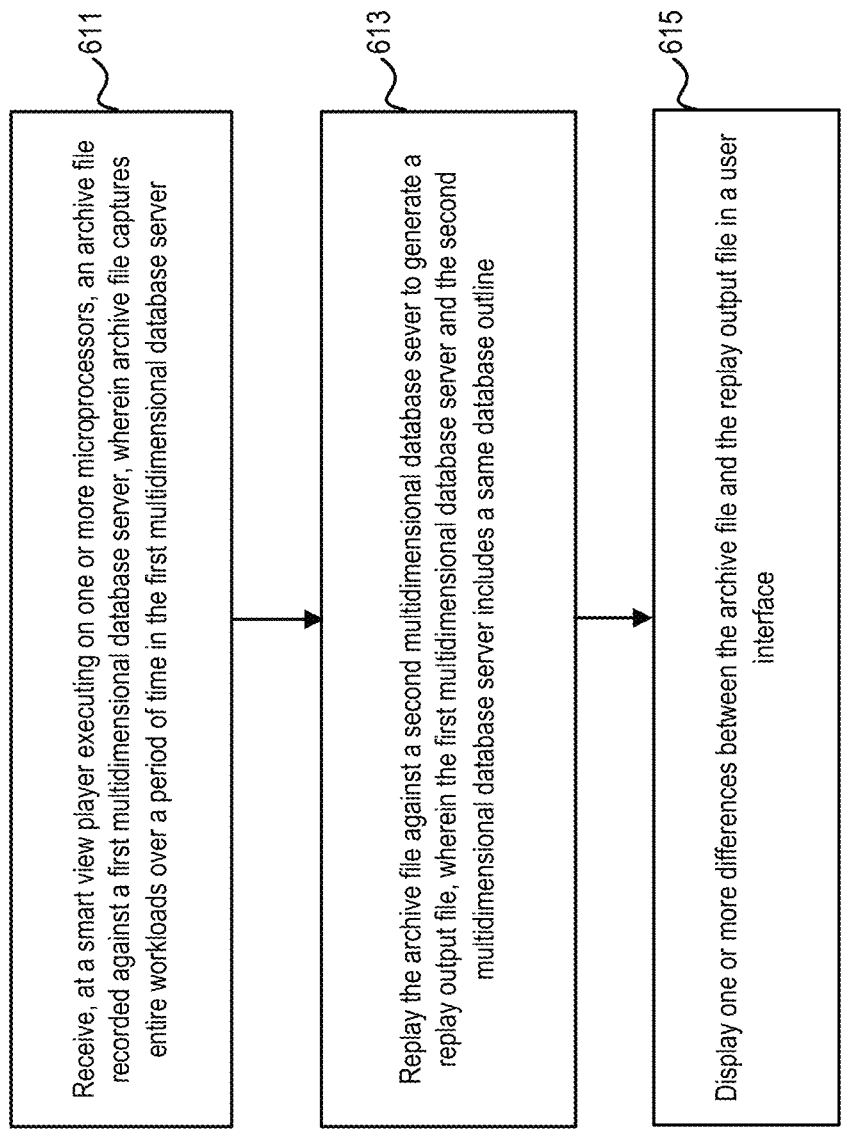
FIG. 6 illustrates a method for capturing workloads in a multidimensional database environment, in accordance with an embodiment.

FIG. 6 illustrates method for capturing workloads in a multidimensional database environment, in accordance with an embodiment.

As shown in FIG. 6, at step 611, a Smart View Player executing on one or more microprocessors receives an archive file recorded against a first multidimensional database server, wherein archive file captures entire workloads over a period of time in the first multidimensional database server.

At step 613, the Smart View Player replays the archive file against a second multidimensional database server to generate a replay output file, wherein the first multidimensional database server and the first multidimensional database server include a same database outline.

At step 615, the Smart View Player can display one or more differences between the archive file and the replay output file in a user interface.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMS, EPROMS, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for use with a multidimensional database, comprising:
   a first multidimensional database server and a second multidimensional database server, wherein the first multidimensional database server and the second multidimensional database server respectively execute on one or more processors and share a same database outline;
   a recorder executing on a first computer having one or more first microprocessors configured to generate an archive file recorded against the first multidimensional database server; and
   a standalone player executing on a second computer having one or more second microprocessors separate from the first and second multidimensional database servers, wherein the standalone player is configured to:
     receive the archive file recorded against the first multidimensional database server;
     selectively replay portions of the archive file against the second multidimensional database server to generate a replay output file and, during replay, selectively replace one or more inputs captured in the archived file;
     determine one or more differences between the recorded archive file and the replay output file; and
     output the one or more differences between the recorded archive file and the replay output file to a user interface.

2. The system of claim 1, wherein to generate the archive file the recorder is further configured to capture workloads in the first multidimensional database over a period of time.

3. The system of claim 2, wherein the workloads include interactions between a client application and the first multidimensional database together with results received from the first multidimensional database server in response to inputs from a user.

4. The system of claim 1, wherein the standalone player is configured to apply one or more inputs in the recorded archive file against the second multidimensional database server during the replay of the recorded archive file, and to dynamically replace one or more inputs in the recorded archive file with values specified at runtime.

5. The system of claim 1, wherein the standalone player is configured to simultaneously replay a plurality of archive files against the second multidimensional database server.

6. The system of claim 1, wherein the standalone player is further configured to utilize one or more filters configured to filter out expected differences between the recorded archive file and the replay output file.

7. The system of claim 1, wherein each of the one or more differences is represented by a combined output showing of a user request executed against the first and second multidimensional database, a first value or property from one or more cells of the first multidimensional database from the recorded archive file returned in response to the user request, a second value or property from one or more cells of the second multidimensional database from the replay output file returned in response to the user request, and respective paths pointing to the first and second cells in the multidimensional databases.

8. A method for use with a multidimensional database, comprising:
 generating, with a recorder, an archive file recorded against the first multidimensional database server;
 receiving, at a standalone player, the archive file recorded against the first multidimensional database server;
 replaying the archive file against the second multidimensional database server to generate a replay output file, wherein replaying includes selectively replaying portions of the archive file against the second multidimensional database server and, during replay, selectively replacing one or more of the inputs captured by the archive file;
 determining one or more differences between the recorded archive file and the replay output file; and
 outputting the one or more differences between the recorded archive file and the replay output file to a user interface.

9. The method of claim 8, wherein generating the archive file includes capturing workloads in the first multidimensional database over a period of time, wherein capturing workloads includes capturing interactions between a client application and the first multidimensional database together with results received from the first multidimensional database server in response to inputs from a user.

10. The method of claim 8, further comprising applying one or more inputs in the recorded archive file against the second multidimensional database server during the replay of the recorded archive file, and dynamically replacing one or more inputs in the recorded archive file with values specified at runtime.

11. The method of claim 8, wherein each of the one or more differences is represented by a combined output showing of a user request executed against the first and second multidimensional database, a first value or property from one or more cells of the first multidimensional database from the recorded archive file returned in response to the user request, a second value or property from one or more cells of the second multidimensional database from the replay output file returned in response to the user request, and respective paths pointing to the first and second cells in the multidimensional databases.

12. The method of claim 8, wherein the first multidimensional database server and the second multidimensional database server include a same database outline.

13. A non-transitory computer readable storage medium, including instructions for a standalone player stored thereon which when read and executed by one or more computers cause the one or more computers to perform the steps comprising:
 generating, with a recorder, an archive file recorded against the first multidimensional database server;
 receiving, at a standalone player, the archive file recorded against the first multidimensional database server;
 selectively replaying one or more portions of the archive file against the second multidimensional database server to generate a replay output file and, during replay, selectively replacing one or more inputs captured by the archive file;
 determining one or more differences between the recorded archive file and the replay output file; and
 outputting the one or more differences between the recorded archive file and the replay output file to a user interface,
 wherein the first multidimensional database server and the second multidimensional database server include a same database outline.

14. The non-transitory computer readable storage medium of claim 13, wherein the instructions further cause the one or more computers to perform the steps of capturing workloads in the first multidimensional database over a period of time, wherein capturing workloads includes capturing interactions between a client application and the first multidimensional database together with results received from the first multidimensional database server in response to inputs from a user.

15. The non-transitory computer readable storage medium of claim 13, wherein the instructions further cause the one or more computers to perform the steps of applying one or more inputs in the recorded archive file against the second multidimensional database server during the replay of the recorded archive file, and dynamically replacing one or more inputs in the recorded archive file with values specified at runtime.

16. The non-transitory computer readable storage medium of claim 13, wherein each of the one or more differences is represented by a combined output showing of a user request executed against the first and second multidimensional database, a first value or property from one or more cells of the first multidimensional database from the recorded archive file returned in response to the user request, a second value or property from one or more cells of the second multidimensional database from the replay output file returned in response to the user request, and respective paths pointing to the first and second cells in the multidimensional databases.

17. The non-transitory computer readable storage medium of claim 13, wherein the instructions further cause the one or more computers to perform the steps of simultaneously replaying a plurality of archive files against the second multidimensional database server.

* * * * *